UNITED STATES PATENT OFFICE.

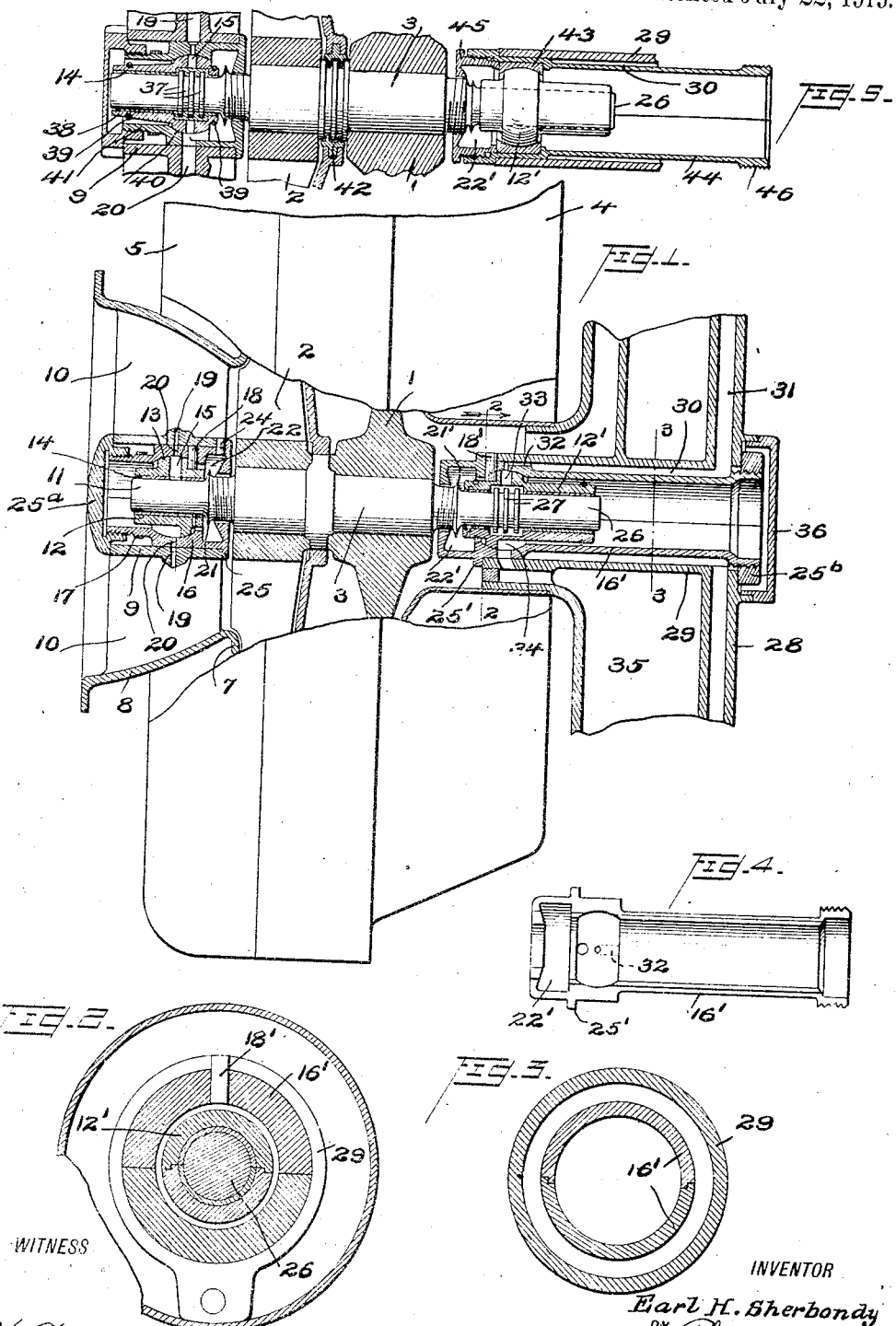

EARL H. SHERBONDY, OF CLEVELAND, OHIO.

BEARING-ASSEMBLY.

1,310,679.            Specification of Letters Patent.     Patented July 22, 1919.

Application filed April 30, 1918. Serial No. 231,766.

*To all whom it may concern:*

Be it known that I, EARL H. SHERBONDY, a citizen of the United States, residing at Cleveland, in the county of Cuyahoga and State of Ohio, have invented certain new and useful Improvements in Bearing-Assembly, (Case Q,) of which the following is a specification.

This invention relates to a bearing assembly, more particularly to a bearing assembly for use in connection with the bearings of a turbo-compressor, which comprises the usual turbine wheel and compressor wheel mounted on the same shaft.

It is an object of the invention to provide a bearing assembly which may be readily positioned in place in the casting, forming the main parts of the turbo-compressor unit. It is of importance in rapidity and cheapness of production to have these main castings in one piece, and the bearing assembly of this invention is designed to permit of mounting the bearings and housings in said castings, without splitting the castings.

Other objects and advantages will appear as the description proceeds.

In the drawings, Figure 1 is a side view, parts being broken away and shown in sections of a turbo-compressor unit and the bearing assembled in position; Fig. 2 is a section on the line 2—2 of Fig. 1; Fig. 3 is a section on the line 3—3; Fig. 4 is a plan view of the upper half of the bearing housing shown at the right of Fig. 1, and Fig. 5 is a view of a modification in which the thrust bearing is located on the opposite end of the shaft.

Referring more particularly to the drawings, the turbo-compressor comprises the turbine wheel 1 and the blower wheel 2, mounted on the common shaft 3. The turbine casing is indicated at 4, and the blower casing at 5. The details of these casings and the means of operating the turbine form no part of this invention, and need not be described.

The front wall 7 of the blower casing is cast integrally with the flaring mouth 8, for the ingress of the air to the wheel 2. The casing 9 for the bearing housing is cast integral with the flaring mouth 8, and front wall 7 of the blower casing, and is supported by a series of curved blades 10, cast integral with parts 7, 8 and 9. The arrangement of these blades is particularly described in my co-pending case Serial No. 231,767 filed April 30, 1918. The end 11 of the shaft 3 is mounted in bearing 12, which may be provided with the usual spherical seat 13, 14 represents a thin layer of babbitt. Bearing 12 is provided with an oil hole 15. Bearing 12 is not split, being preferably made in one piece.

Arranged around bearing 12 is the split housing 16, provided with the usual spherically curved concave seat for the spherical part 13 for the bearing 12. The split section of the housing 16 may be held together by a ring 17. A pin 18, located in suitable recesses in the housing and bearing keys of these two elements together.

The casing 9 is provided with an oil duct 19, which registers with a similar duct 20 in the housing, it in turn registering with the oil passage 15 and bearing 12.

The shaft 3 carries a flange 21, located laterally with respect to the bearing 12, the purpose of this flange being to throw off, by centrifugal force any oil that may leak onto that part of the shaft. The housing 16 is made to form an oil collecting chamber 22, immediately around this flange. The shaft 3 may be provided with ordinary screw threads 23, cut in a direction such as to throw any oil that may leak thereon, onto the flange 21. The oil collected in the chamber 22 escapes through suitable grooves and out through the lower oil ducts 20 and 19. The right hand wall of the chamber 22 terminates just short of the threads 23, to give a slight clearance. The housing 16 may be keyed to the casing 9 by pin 24.

The housing 16 is flanged, as at 25, to abut against the casing 9. The other end of the housing is threaded to provide engagement for threaded cap 25ª, which cap abuts the casing 9.

In assembling the parts the bearing is slipped on to the end 11 of the shaft; the two parts of the housing 16 are fastened in place thereover, and keyed together; then the parts are inserted in the right hand end of the casing 9, after which the cap 25ª is put on and screwed up to bring the flange 25 into tight engagement with the casing 9. The parts are thus assembled, keeping the casing 9 integral.

The other end 26 of the shaft is mounted in a bearing 12′ similar to bearing 12, but made in two parts; this end of the shaft may carry the usual thrust flanges 27.

The housing 16′ is similar in general design to the housing 16, the proportions differing somewhat. The housing 16', which is made in two parts, as shown in Fig. 3, is mounted in a casting 28. This casting 28 is provided with an annular recess, formed by walls 29 for the reception of the housing 16'; the wall 29 is slightly spaced from the housing 16', to leave the oil duct 30, which is in communication with oil duct 31, in the casting 28. Oil from the duct 30 is lead to the bearing surfaces through a suitable oil groove 32, in casing 16', and through hole 33 in the bearing to the bearing surfaces. The oil escapes from the bearing surfaces through a passage 34, formed by registering holes in the bearing, housing, and the wall 29, finally reaching chamber 35 in the casting 28. The bearing 12', housing 16' and walls 29 may be keyed together by a pin 18' engaging in suitable recess.

This end of the shaft carries a flange 21', and the adjacent part of the housing forms an oil collecting chamber 22', similar to the chamber 22 already described. The two parts of the housing 16' are flanged to provide a flange 25', that abuts the wall 29 of the casting 28. The other end of the housing is threaded to provide engagement for a cap 25ᵇ, which cap when tightened up draws the flange 25' tightly in position against the wall 29. Another cap 36 may be provided, if desired. The parts described are assembled by clamping the two parts of the bearing 12' over the end 26 and flanges 27, then the two parts of the housing 16' are put in position over the bearing 12', then the casting 28 is inserted over these parts, and clamped in position by putting on the cap 25ᵇ, and tightening it up. It should be noted that the bearing assembly is now in position in the one-piece casting 28.

In Fig. 5 I have shown a modification in which the thrust bearing is shown positioned at the blower end of the shaft 3, instead of at the turbine end of said shaft, as in Fig. 1. The location of this thrust bearing at the blower end of the shaft is of distinct advantage in a turbo-compressor assembly in which the turbine is operated by the waste gases from an internal combustion engine, as here. The turbine casing 4, it has been found, gets quite hot and is liable to a certain amount of expansion and distortion. This expansion and distortion make it difficult to properly position the wheels 1 and 2 in their respective casings. Subsequent adjustment of the shaft to properly position the wheel 1, so that sufficient clearance is provided, throws out the positioning of the wheel 2, where the two casing units are fastened together as are the casing units 4 and 5. The blades of the wheel 2 should be, for efficient operation, close to the walls of the blower casing, the amount of this clearance in the case of the blades of the blower wheel being smaller than in the case of the amount of clearance for the turbine wheel and its casing. So by the time the turbine wheel is adjusted, the compressor wheel will probably be way out of adjustment. In order to remedy this, the thrust bearing is put on the other end of the shaft, that is to say, on the blower end, adjustment of the wheels taking place starting with the blower wheel, rather than with the turbine wheel. In fact, with the arrangement shown in Fig. 5, the parts, if made with reasonable accuracy, when assembled will immediately position the blower wheel in proper place, without any subsequent adjustment.

Referring now to Fig. 5, which illustrates in detail this arrangement, corresponding parts are indicated by corresponding reference characters.

The blower end of the shaft 3 is provided with one or more thrust flanges 37, which engage in suitable grooves in the bearing 38, which may be made in two parts, held together by suitable clamping means 39, and provided with the usual spherical seat 40, the mentioned parts being surrounded by a bearing housing 41, which may be supported and is similar to the bearing housing 16' in Fig. 1. As in Fig. 1, the part 9 serves as a casing for the bearing housing. Oil grooves 15, 19 and 20 may be provided as in Fig. 1 to lead oil to the bearing surfaces. The other parts of the bearing are substantially the same as in Fig. 1.

A labyrinth packing 42 may be positioned between the wheels 3 and 2, if desired.

The end 26, that is the turbine end of the shaft 3, is mounted in a one-piece bearing 12', of the same type as the bearing 12 in Fig. 1. This bearing 12', having the usual annular seat, is located in a collar 43, suitably concaved for positioning said spherical seat. This collar 43 is in turn supported in the two-part annular collar housing 44, which in turn is mounted so as to be slightly spaced from the wall 29 of the casting, to provide an oil duct 30, as is done in Fig. 1. The collar housing 44 may be internally threaded to provide a mounting means for an annular element 45, which defines the oil collecting chamber 22'. The collar housing may be threaded at its other end as at 46, for engagement with an adjusting cap 25ᵇ, which bears against the wall 28 of the casting, precisely as in Fig. 1. The bearing, collar and collar housing just described may be provided with pins pinning them together, and with suitable oil grooves for circulating oil, in much the same manner as is done in connection with the corresponding parts in Fig. 1.

As before explained, positioning of the thrust bearing at the compressor end of the shaft will immediately and accurately position the blower wheel in its casing, any further necessary adjustment being taken care of by adjustment of the turbine casing with respect to the turbine wheel, which is readily enough accomplished, since the clearances there are larger.

While I have illustrated possible embodiments of my invention, it should be understood that the invention may be carried out in other ways, as defined within the scope of the appended claims.

I claim:

1. In a bearing assembly, a bearing, a housing therefor, a casing surrounding said housing, said casing and said housing being provided with interengaging means adapted to be brought into engagement upon relative longitudinal movement of said casing and said housing, and means engaging with the housing and with the casing to bring said interengaging means into engagement.

2. In a bearing assembly, a one-piece bearing provided exteriorly with a spherically curved portion, a split housing for said bearing, provided interiorly with a corresponding spherically curved portion adapted to engage with the spherically curved portion of said bearing, and mounting means for said housing.

3. In a bearing assembly, a bearing provided exteriorly with a spherically curved portion, a housing for said bearing provided exteriorly with a spherically curved portion, a housing for said bearing provided interiorly with a corresponding spherically curved portion adapted to engage with the spherically curved portion of said bearing, a casing for said housing, said housing and said casing being provided with interengaging means adapted to be effective upon relative longitudinal movement of said housing and said casing, and means, engaging with said housing and said casing to bring said interengaging means into engagement.

4. In a bearing assembly, a bearing, a housing therefor, a casing surrounding said housing and spaced therefrom to provide an oil path, and means engaging said housing and said casing for holding the two together.

5. In a bearing assembly, a bearing, a housing therefor, a casing provided with an oil duct surrounding said housing, and spaced therefrom to provide an oil path between said housing and said casing, into which said oil duct opens, and means for mounting the housing in position in said casing.

6. In a bearing assembly, a bearing, a split housing therefor, a one-piece casing surrounding said housing, and means engaging said casing and said housing for fastening the two together.

7. The combination as claimed in claim 6, said casing and said housing carrying registering oil ducts.

8. In a bearing assembly for a turbo-compressor, a shaft carrying thrust flanges at the compressor end thereof, a bearing near the compressor end of said shaft inclosing said thrust flanges, a compressor wheel casing, a bearing casing fixed relatively thereto, and means to position said bearing in said bearing casing.

In testimony whereof I affix my signature.

EARL H. SHERBONDY.